July 27, 1954 — C. H. SPARKLIN — 2,684,881
THRUST BEARING STRUCTURE
Filed Dec. 2, 1950

Inventor:
Charles H. Sparklin,
By Schroeder, Merriam,
Hofgren & Brady, Attys.

Patented July 27, 1954

2,684,881

UNITED STATES PATENT OFFICE 2,684,881

THRUST BEARING STRUCTURE

Charles H. Sparklin, Chicago, Ill., assignor to Birtman Electric Company, a corporation of Illinois Application December 2, 1950, Serial No. 198,786

3 Claims. (Cl. 308—233)

This invention relates to a bearing structure and particularly to a thrust bearing for resisting the end thrust of a rotating shaft.

Where a shaft such as a rotatable motor shaft is employed for rotating pieces of equipment a considerable end thrust is developed. This end thrust tends to wear away bearing structures designed to resist this force. The problems of proper lubrication of these bearings are complicated by the fact that a considerable amount of lubricant is necessary.

In order to overcome the above problems I have invented a bearing structure where there is provided a cup holding a ball for contact with a bearing surface. At least one of this cup and ball comprises a rigid porous material such as compressed powdered metal and adapted to contain a lubricant. In one embodiment the portions of the cup adjacent the ball are porous and there is provided a lubricant reservoir associated with the cup and ball. In a specific embodiment this lubricant reservoir comprises a felt wick adapted to contain lubricant and positioned against the outer surface of the cup. In another embodiment the ball is porous and the space between the cup and the ball is adapted to contain a supply of lubricant.

The invention will be described as related to the embodiments shown in the accompanying drawings.

Figure 1:
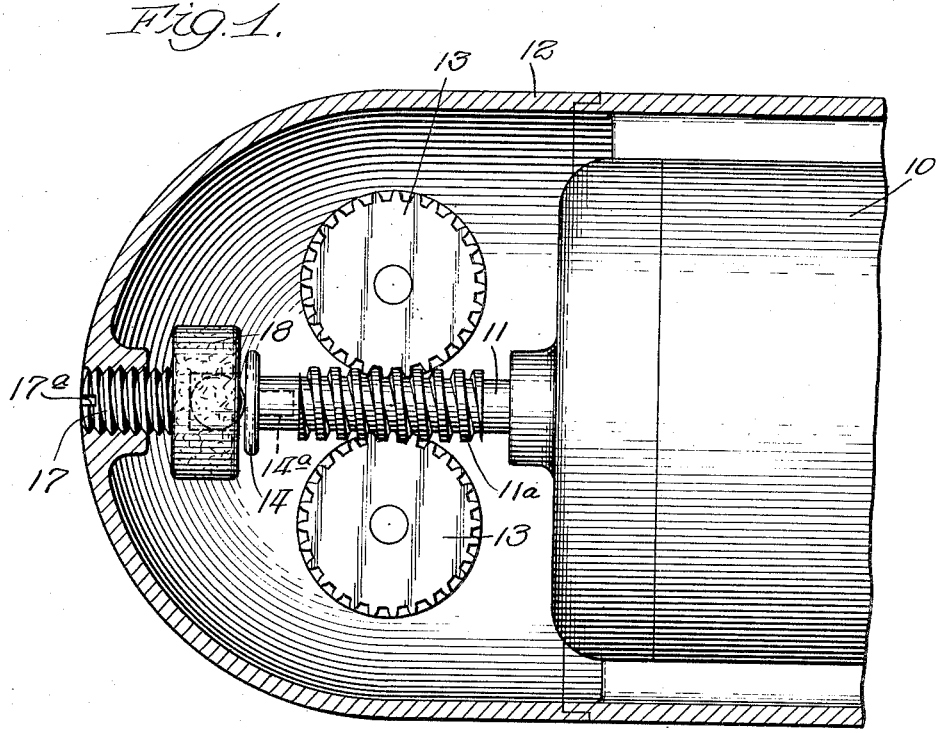
Figure 2:
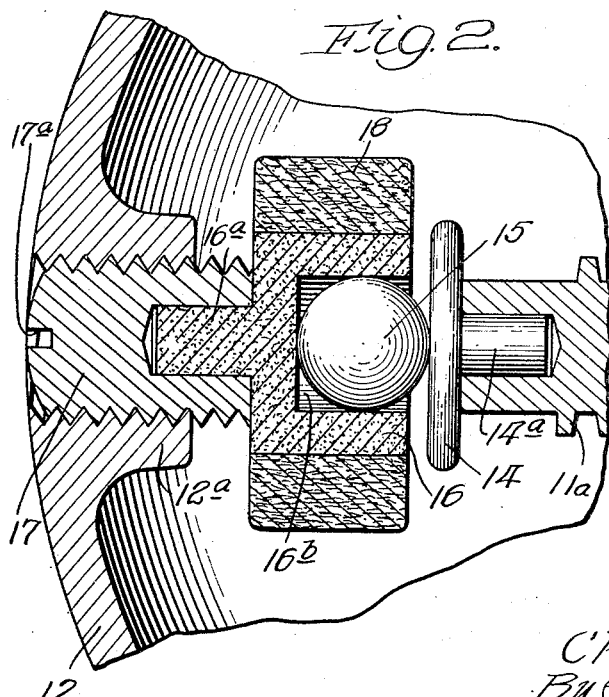
Figure 3:
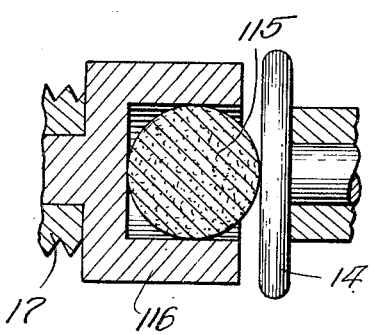

In the drawings, Fig. 1 is a fragmentary longitudinal section through the casing housing the motor and gear mechanism of a food mixer and illustrating one embodiment of the bearing structure. Fig. 2 is an enlarged section through the bearing structure of Fig. 1, and Fig. 3 is an enlarged fragmentary view somewhat similar to Fig. 2 but showing a second embodiment of the invention.

In the accompanying drawings the invention is illustrated as applied to the shaft of a motor used in a food mixer for rotating a pair of beaters in opposite directions. In such an apparatus the end thrust of the motor shaft amounts to a considerable force.

In the embodiment shown in Figs. 1 and 2 the motor 10 including the shaft 11 as well as the gears and bearings are housed in an enveloping housing 12. The end of the shaft 11 extending from the motor 10 is shaped to provide a worm gear 11a. This worm gear engages a pair of circular gears 13 located on opposite sides of the shaft 11. Such an arrangement of worm 11a and circular gears 13 for use in food mixers to rotate beaters in opposite directions is conventional and well understood by those skilled in the art.

Due to the reaction of the rotating circular gears 13 on the worm 11a and thus the motor shaft 11, the end thrust of the shaft to the left as viewed in Figs. 1 and 2 is of considerable magnitude. In order to resist this thrust the outer end of the motor shaft 11 is provided with a bearing surface in the form of a circular disc 14 having a stem 14a locked within a corresponding cavity in the outer end of the shaft 11. Bearing against this disc 14 at substantially the center of rotation thereof there is provided a ball 15 located within a cup 16 of substantially cylindrical shape. The flat end surface of this cup is provided with an outwardly extending stem 16a locked within a corresponding cavity within a threaded stud member 17. This stud member 17 has the outer surface provided with a screw thread engaging a similarly shaped threaded opening in an enlarged end section 12a of the housing 12. As is shown in Figs. 1 and 2 the stud member 17 has its outer end exposed and is provided with a groove 17a for rotating the stud member and positioning the cup 16 and thus the ball 15 relative to the end of the motor shaft 11 and thus the disc 14.

In the embodiment of Figs. 1 and 2 the cup 16 comprises a rigid porous material such as compressed powdered metal. The outer surface of the cup is provided with a lubricant wick 18 serving as a lubricant reservoir. This wick may be of wool felt or the like and may be fastened in place by any means desired. The space 16b between the cup and the ball 15 may also be filled with a lubricant if desired. In use, lubricant is transferred from the wick 18 through the porous cup 16 to the ball 15 so that the ball is always well lubricated. Such an arrangement reduces the wear on the ball and extends the effective life of this ball to a considerable extent. Ball thrust bearings have been used before but they have not been entirely satisfactory as they are subject to excessive wear and soon get out of round, but with the structure of this invention the ball is maintained in well lubricated condition and its effective life is extended many times.

In the embodiment of the invention shown in Fig. 3 the cup 116 is of solid metal while the ball 115 is made of rigid porous material such as powdered metal. In this embodiment the ball itself stores a considerable amount of lubricant which is fed to the surface of the ball as the lubricant is worn away. Here also the space between the ball 115 and the cup 116 may be filled with a lubricant and this serves as an added source of supply in addition to the lubricant contained within the ball.

Having described my invention as related to the embodiments shown in the drawings, it is my intention that the invention be not limited by any of the details of description, unless otherwise specified, but rather be construed broadly within its spirit and scope as set out in the accompanying claims.

I claim:

1. A thrust bearing comprising: a ball adapted to contact a bearing member, a cup having a cavity in which the ball is retained, the cup enclosing substantially all surface portions of said ball except the surface portion contacting the bearing member, and means for rigidly supporting said cup, at least one of the ball and cup being porous metal for association with a lubricant and the ball being rotatable within the cup.

2. The bearing of claim 1 wherein the cup is porous metal and a lubricant wick is provided in contact with the outer surface thereof.

3. The bearing of claim 1 wherein the bearing member normally extends beyond the ball retaining cavity of the cup with the rim of the cup being closely adjacent to the bearing member.

References Cited in the file of this patent

UNITED STATES PATENTS

| Number | Name | Date |
|---|---|---|
| 879,115 | McLeod | Feb. 11, 1908 |
| 1,469,424 | McQuaid et al. | Oct. 2, 1923 |
| 2,104,216 | Albrecht | Jan. 4, 1938 |
| 2,269,606 | Spear | Jan. 13, 1942 |
| 2,564,307 | Keiser | Aug. 14, 1951 |

FOREIGN PATENTS

| Number | Country | Date |
|---|---|---|
| 220,852 | Great Britain | Aug. 28, 1924 |